United States Patent
Yamamoto et al.

(10) Patent No.: US 8,943,524 B2
(45) Date of Patent: Jan. 27, 2015

(54) CHANNEL SELECTIVE INFORMATION TRANSMITTING DEVICE, CHANNEL SELECTIVE INFORMATION TRANSMITTING METHOD AND ITS PROGRAM, AND MEMORY MEDIUM

(75) Inventors: Hideki Yamamoto, Tokyo (JP); Masayuki Takezawa, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 688 days.

(21) Appl. No.: 12/597,029

(22) PCT Filed: Mar. 27, 2008

(86) PCT No.: PCT/JP2008/055909
§ 371 (c)(1),
(2), (4) Date: Oct. 22, 2009

(87) PCT Pub. No.: WO2008/132923
PCT Pub. Date: Nov. 6, 2008

(65) Prior Publication Data
US 2010/0083297 A1    Apr. 1, 2010

(30) Foreign Application Priority Data
Apr. 23, 2007    (JP) .................................. 2007-112813

(51) Int. Cl.
*H04H 60/33*    (2008.01)
*H04N 7/173*    (2011.01)
(Continued)

(52) U.S. Cl.
CPC ........ *H04N 7/17336* (2013.01); *H04L 12/1859* (2013.01); *H04N 7/17327* (2013.01);
(Continued)

(58) Field of Classification Search
CPC ..... H04N 21/00; H04B 17/0035; G08C 19/00
USPC .................................................. 725/9, 92, 98
See application file for complete search history.

(56) References Cited

U.S. PATENT DOCUMENTS

| 2004/0146019 A1 | 7/2004 | Kim et al. |
| 2007/0230423 A1* | 10/2007 | Yoshida et al. ............... 370/338 |

(Continued)

FOREIGN PATENT DOCUMENTS

| CN | 1723638 A | 1/2006 |
| EP | 1852989 A1 | 11/2007 |

(Continued)

OTHER PUBLICATIONS

Website—http://tools.ietf.org/id/draft-hayashi-igap-03.txt.
(Continued)

*Primary Examiner* — Kieu Oanh T Bui
(74) *Attorney, Agent, or Firm* — Rabin & Berdo, P.C.

(57) ABSTRACT

A channel selective information transmitting device is provided for making it possible to carry out the collection of viewing information more accurately even if there is dispersion of viewing channels while suppressing useless facility arrangements. The present invention is directed to a channel selective information transmitting device that transmits channel selective information to inform channels of broadcast signals selected by the users to a viewing information receiving server. The channel selective information transmitting device is provided with a channel change detecting section for detecting channel changes, a transmission waiting time acquiring section for acquiring a transmission waiting time until channel selective information in connection with the changes is transmitted, and a transmitting section for transmitting the channel selective information after a lapse of the acquired transmission waiting time.

20 Claims, 9 Drawing Sheets

(51) Int. Cl.
  *H04L 12/18*    (2006.01)
  *H04N 21/234*   (2011.01)
  *H04N 21/2365*  (2011.01)
  *H04N 21/24*    (2011.01)
  *H04N 21/25*    (2011.01)
  *H04N 21/262*   (2011.01)
  *H04N 21/442*   (2011.01)
  *H04N 21/658*   (2011.01)

(52) U.S. Cl.
  CPC ..... *H04N21/23412* (2013.01); *H04N 21/2365* (2013.01); *H04N 21/2402* (2013.01); *H04N 21/252* (2013.01); *H04N 21/26216* (2013.01); *H04N 21/44222* (2013.01); *H04N 21/6581* (2013.01); *H04N 21/6582* (2013.01)
  USPC .................................. 725/9; 725/92; 725/98

(56) References Cited

U.S. PATENT DOCUMENTS

| | | | |
|---|---|---|---|
| 2008/0216143 A1* | 9/2008 | Ikeda et al. | 725/116 |
| 2010/0083297 A1* | 4/2010 | Yamamoto et al. | 725/9 |
| 2011/0061084 A1* | 3/2011 | Bejerano et al. | 725/109 |

FOREIGN PATENT DOCUMENTS

| | | |
|---|---|---|
| JP | 8-205123 | 8/1996 |
| JP | 2004-242063 | 8/2004 |
| JP | 2004320360 A | 11/2004 |
| JP | 2005039681 A | 2/2005 |
| JP | 2005-303454 | 10/2005 |
| JP | 2007-086869 | 4/2007 |
| JP | 4506885 B2 | 7/2010 |
| WO | WO2004/043019 | 5/2004 |
| WO | WO 2006/075747 | 7/2006 |

OTHER PUBLICATIONS

Japanese Office Action dated Jul. 3, 2012, issued in the corresponding Japanese Patent Application No. 2010-159553 with English translation.

Japanese Office Action dated Jul. 3, 2012, issued in the corresponding Japanese Patent Application No. 2010-159554 with English translation.

Japanese Office Action dated Jun. 26, 2012, issued in corresponding Japanese Patent Application No. 2010-112923 with English Translation.

Japanese Office Action dated Dec. 11, 2012, issued in the corresponding Japanese Patent Application No. 2010-112923 with English translation.

Japanese Office Action dated Mar. 5, 2013, issued in the corresponding Japanese Patent Application No. 2010-159553 with English translation.

Japanese Office Action dated Mar. 5, 2013, issued in corresponding Japanese Patent Application No. 2010-159554 with English translation.

Japanese Office Action "Reconsideration Report" dated Jul. 8, 2014, issued in corresponding Japanese Patent Application No. 2010-159553 with English Translation.

Japanese Office Action "Reconsideration Report" dated Jul. 8, 2014, issued in corresponding Japanese Patent Application No. 2010-159554 with English Translation.

D. Estrin, D. Farinacci, A. Helmy, D. Thaler, S. Deering, M. Handley, V. Jacobson, C. Liu, P. Sharma, L. Wei; "Protocol Independent Multicast-Sparse Mode (PIM-SM): Protocol Specification"; Network Working Group, Request for Comments: 2117, Category: Experimental; Jun. 1997; pp. 1-66; URL: http://tools.ietf.org/pdf/rfc2117.pdf.

* cited by examiner

FIG.2

| CHANNEL NAME 201 | MULTICAST SOURCE ADDRESS 202 | MULTICAST GROUP ADDRESS 203 |
|---|---|---|
| 101 | 2001:2::1 | Ff38::23 |
| 202 | 2001:2::2 | Ff38::23 |
| 313 | 2001:2::3 | Ff38::23 |

FIG.3

| ADDRESS OF VIEWING RATE RECEIVING SERVER 301 | CHANNEL INFORMATION TRANSMISSION INTERVAL 302 |
|---|---|
| 2002::33 | 120 SEC |

FIG.9

| MULTICAST ADDRESS |
|---|
| 2001:2::1 |
| 2001:2::2 |
| 2001:2::3 |

FIG.10

| ADDRESS OF VIEWING RATE RECEIVING SERVER | 2002::33 | ~1001 |
|---|---|---|
| MULTICAST ADDRESS INFORMATION ACQUIRING INTERVAL | 600 SEC | ~1002 |
| MULTICAST INFORMATION TRANSMISSION INTERVAL | 120 SEC | ~1003 |

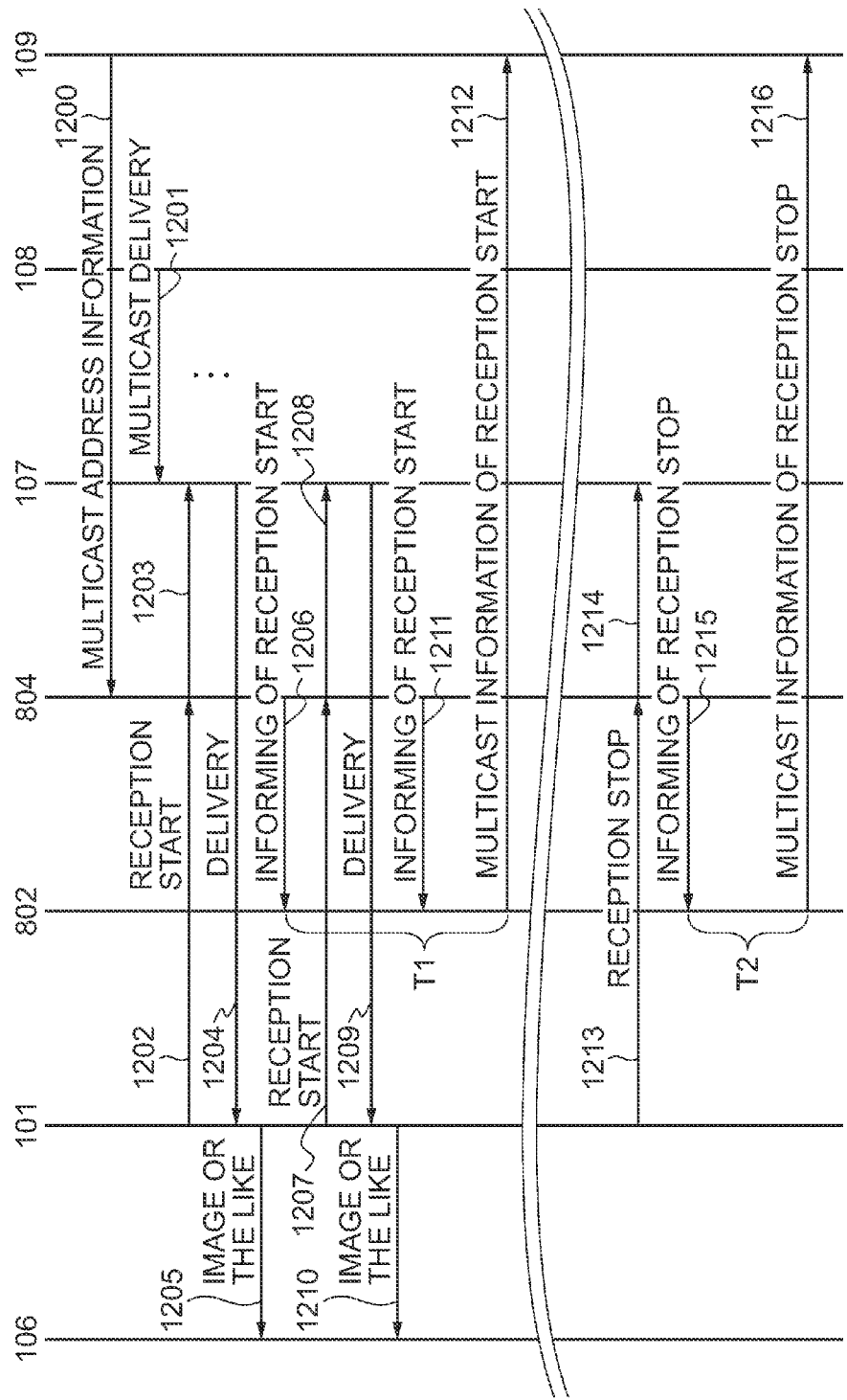

CHANNEL SELECTIVE INFORMATION TRANSMITTING DEVICE, CHANNEL SELECTIVE INFORMATION TRANSMITTING METHOD AND ITS PROGRAM, AND MEMORY MEDIUM

TECHNICAL FIELD

The present invention relates to a channel selective information transmitting device, a channel selective information transmitting method and its program, and a memory medium. For example, the present invention is applicable to an IP multicast receiving terminal or a home gateway.

RELATED ART

In a TV broadcast (hereinafter, called an IP multicast broadcast) system by an IP protocol, using multicast delivery or a broadcast service by CATV, the collection of viewing information (such as information of a selected channel) is important for accurately evaluating programs and identifying the favors of the viewers.

There has been proposed a system called IGAP (Internet Group membership Authentication Protocol) that collects, as the viewing information, which is an information that indicates the time of viewing start, via a router in multicast delivery (see Non-Patent Document 1).

The IGAP system has a mechanism of extending a multicast router to enable only the users who make an appropriate viewing contract to receive multicast.

The multicast broadcast system often uses a different multicast address for each of channels. Accordingly, each time the channels are changed by a receiving terminal, the instructions of multicast reception stop before change, and multicast reception start after change are transmitted and received between the receiving terminal and the closest router. In this case, user information is transmitted to the router and is then authenticated by the router, thereby enabling only the appropriate users to perform reception. A viewing rate receiving server collects, as the viewing information, part of the information transmitted to the router at the time of such channel change.

However, in the conventional viewing information collecting system using the IGAP system has the following problems.

(1) When many viewers change the multicast reception channels simultaneously at the start time of a popular program (e.g., the start time of the Olympic opening ceremony), change requests are caused to all routers at the same time, and the change requests are excessively concentrated on each of the routers. Each of the routers makes authentication requests of an authentication server, according to the change requests. However, due to the excessive concentration of the change requests, a sufficient response speed cannot be secured as a response from the authentication server. As a result, many pieces of viewing information may not reach the viewing rate receiving server, and may be disposed.

(2) To avoid such problems, it is considered to arrange large allowance in facility arrangements, such as routers. However, arranging large allowance in facility arrangements for only temporary concentration may lead to great needlessness, and cost problem may arise.

Non-Patent Document 1: http://tools.ietf.org/id/draft-hayashi-igap-03.txt

DISCLOSURE OF THE INVENTION

Problems to be Solved by the Invention

There have been desired a channel selective information transmitting device, method, and program, that makes more accurately possible to carry out the collection of viewing information, even if bias of viewing channels while suppressing useless facility arrangements.

Method of Solving the Problem

A first aspect of the present invention is a channel selective information transmitting device, that transmits channel selective information that indicates a channel of a broadcast signal selected by a user to a viewing information receiving server, including (1) a channel change detecting section that detects a change of the channel, (2) a transmission waiting time acquiring section that acquires a transmission waiting time from a time of the change of the channel, until transmission of the channel selection information that relates to the change, and (3) a transmitting section that transmits the channel selection information after the acquired transmission waiting time has elapsed.

A second aspect of the invention is a channel selective information transmitting method that transmits channel selective information that indicates a channel of a broadcast signal selected by a user to a viewing information receiving server, including (1) detecting a change of the channel by a channel change detecting section, (2) acquiring a transmission waiting time from a time of the change of the channel until transmission of the channel selection information that relates to the change by a transmission waiting time acquiring section, and (3) transmitting the channel selection information after the acquired transmission waiting time has elapsed by a transmitting section.

A third aspect of the invention is a channel selection information transmitting program that transmits channel selection information that indicates a channel of broadcast signal selected by a user to a viewing information receiving server, the program allowing a computer to function as (1) a channel change detecting section that detects a change of the channel, (2) a transmission waiting time acquiring section that acquires a transmission waiting time from a time of the change of the channel until transmission of the channel selection information that relates to the change, and (3) a transmitting section that transmits the channel selection information after the acquired transmission waiting time has elapsed.

Effect of the Invention

According to the channel selective information transmitting device, method, and program of the present invention, the collection of viewing information can be carried out more accurately even if there is dispersion of viewing channels while suppressing useless facility arrangements.

BRIEF DESCRIPTION OF THE DRAWINGS

FIG. 2 is an explanatory view illustrating a channel/address correspondence table incorporated into an IP multicast broadcast receiving section, according to the first exemplary embodiment;

FIG. 3 is an explanatory view illustrating information held by a server information holding section, according to the first exemplary embodiment;

FIG. 9 is an explanatory view illustrating a list of multicast addresses stored in an IP multicast monitoring section, according to the second exemplary embodiment;

FIG. 10 is an explanatory view illustrating information held by a server information holding section, according to the second exemplary embodiment;

FIG. 12 is a sequence diagram of the sections of the IP multicast broadcast system, according to the second exemplary embodiment.

BEST MODE OF IMPLEMENTING THE INVENTION

(A) First Exemplary Embodiment

A first exemplary embodiment of a channel selective information transmitting device and method according to the present invention will be described below in detail with reference to the drawings. The channel selective information transmitting device of the first exemplary embodiment is provided in an IP multicast broadcast receiving terminal that transmits channel selective information.

(A-1) The Configuration of the First Exemplary Embodiment

Figure 1:
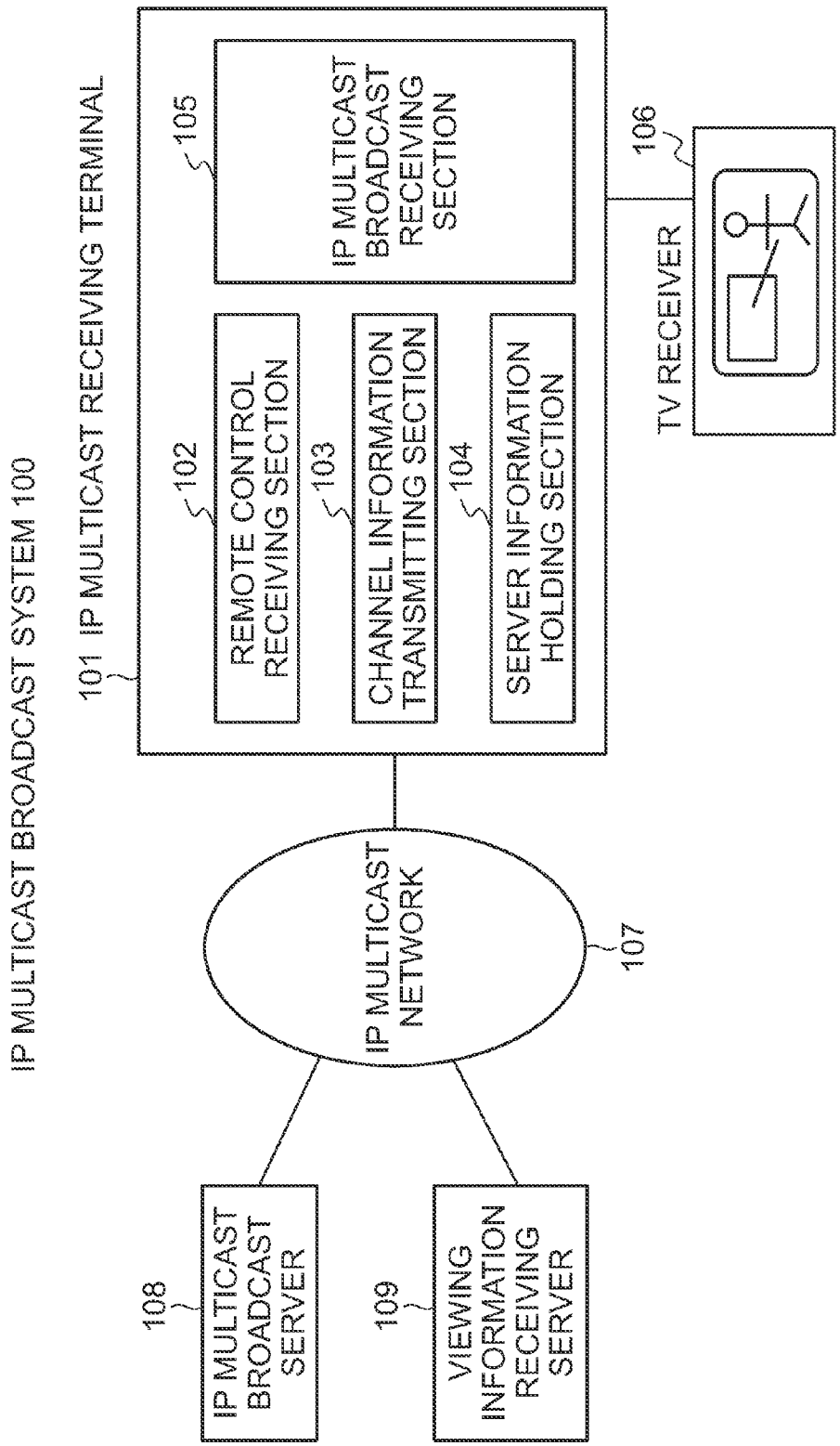
FIG. 1 is a block diagram illustrating the configuration of an IP multicast broadcast system including a channel selective information transmitting device, according to a first exemplary embodiment.

FIG. 1 is a block diagram illustrating the configuration of an IP multicast broadcast system including the channel selective information transmitting device, according to the first exemplary embodiment.

As in FIG. 1, an IP multicast broadcast system 100 includes an IP multicast receiving terminal 101, a television receiver (TV receiver) 106, an IP multicast broadcast server 108, and a viewing information receiving server 109. The IP multicast receiving terminal 101, the IP multicast broadcast server 108, and the viewing information receiving server 109 are connected to an IP multicast network 107.

The IP multicast broadcast server 108 in connection with IP multicast broadcast assembles an IP packet from a video signal and an audio signal included in the IP multicast broadcast, and then transmits the IP packet to the IP multicast network 107. The IP multicast broadcast server 108 performs deliver by using a pair of a multicast source address and a multicast group address (see FIG. 2) determined for each of channels.

The IP multicast broadcast server 108 is the same as the existing one and its detailed configuration is omitted. One IP multicast broadcast server 108 may transmit IP packets of all channels that can be received by the IP multicast receiving terminal 101. Further, for each of channels, plural IP multicast broadcast servers 108 may transmit IP packets of all channels that can be received by the IP multicast receiving terminal 101.

The IP multicast network 107 has plural routers therein. Each of the routers copies and transfers the IP packet of the IP multicast broadcast received thereby to one or plural downstream routers for executing the multicast of the IP packet. Each of the routers holds the received IP packets in connection with each channels, and transfers the IP packet of the channel selected by each of the IP multicast terminals 101 at that point, accommodated in itself, to the IP multicast terminal 101.

The IP multicast receiving terminal 101 is a set top box (STB) that corresponds to a tuner or a decoder of the IP multicast broadcast for serving the function of selecting the signal of the channel selected by the viewer and has a function of decoding the selected signal (IP packet). The IP multicast receiving terminal 101 performs the receiving process of the IP packet of the IP multicast broadcast provided from the closest (accommodating side) router of the IP multicast network 107, decompresses the video signal and the audio signal in connection with the broadcast, and outputs them to the television receiver 106. The form of the video signal transferred from the IP multicast receiving terminal 101 to the television receiver 106 may be a composite video signal or an RGB signal.

In FIG. 1, the IP multicast receiving terminal 101 is illustrated as a dedicated device separated from the television receiver 106, however, its realizing form is not limited to this. The IP multicast receiving terminal 101 may be constructed by installing software into a personal computer. Furthermore, the television receiver 106 may incorporate the IP multicast receiving terminal 101.

The device to which the IP multicast receiving terminal 101 supplies the video signal and the audio signal is not limited to the television receiver 106, and may be an image recording device such as a video tape recorder and a DVD recorder.

As described later, in the first exemplary embodiment, the IP multicast receiving terminal 101 transmits the IP packet including viewing information to the IP multicast network 107.

The viewing information receiving server 109 receives the IP packet (hereinafter, called viewing information, if necessary) of the incoming viewing information via the IP multicast network 107, and produces predetermined statistical information (e.g., the viewing rate of each channel and the viewing rate of each program). In the first exemplary embodiment, the viewing information is one piece or plural pieces of channel information, and user specified information is not included in the channel information. However, when the user specified information is included in the channel information, the viewing information receiving server 109 may be configured to produce user favorite information (e.g., a sports program viewing rate and a news program watching total time during a week).

The channel information is a channel name in which new viewing has started, a channel name in which viewing has stopped, and a new channel's viewing start time (the channel designated time or the time at which the channel information is held). The channel information immediately after a power-on instruction does not have the channel name in which viewing is stopped. The channel information immediately after a power-off instruction does not have the channel name in which new viewing has started and the new channel's viewing start time. The viewing information receiving server 109 assumes, as basic information, the number of viewing starts and the number of viewing stops by channel at each previous time for a predetermined period, and updates the basic information according to the incoming channel information. The viewing rate is produced by processing the basic information.

The viewing information receiving server 109 may use the same server as any one of the IP multicast broadcast servers 108. The viewing information receiving server 109 may be installed as the server of a third-party organization, which is different from the IP multicast broadcast provider.

As described above, the IP multicast receiving terminal 101 may be constructed by either a dedicated device or a general-purpose device, may be configured by being incorporated into a different device, and may have some functions configured by software. However, the IP multicast receiving terminal 101 functionally has the detailed configuration as illustrated in FIG. 1.

That is, the IP multicast receiving terminal 101 includes a remote control receiving section 102, a channel information transmitting section 103, a server information holding section 104, and an IP multicast broadcast receiving section 105.

The remote control receiving section 102 receives a remote control signal from a remote control transmitting device, not illustrated, analyzes the received remote control signal, and provides the analyzed information to the IP multicast broadcast receiving section 105. The remote control transmitting device, not illustrated, has a key for selecting a channel and a key for adjusting volume.

For example, the channel selection is input by operating the enter key after inputting a channel number (hereinafter, called a channel name) using the ten-key pad. For example, a predetermined digit number (three digits) in connection with the channel name is input by the ten-key pad, when the three-digit number input is the number in connection with the channel name, the channel is assumed to be input. For example, the channel selection screen including the channel selection is displayed on the television receiver 106, and the selection at which the cursor is located is changed according to the operation of the cursor moving key. When the enter key is operated, the channel of the selection at which the cursor is located is assumed to be designated. The remote control signal is transmitted for each key operation. The remote control receiving section 102 analyzes the remote control signal to identify channel update, and provides the new channel name to the IP multicast broadcast receiving section 105.

In FIG. 1, the operating device that can be operated by the viewer is only the remote control transmitting device. In addition to this or in place of this, an operating section may be provided in the housing of the IP multicast receiving terminal 101.

Basically, the IP multicast broadcast receiving section 105 performs the receiving process of the IP packet of the IP multicast broadcast, provided from the closest (accommodating side) router, decompresses the video signal and the audio signal in connection with the broadcast, and outputs them to the television receiver 106.

The IP multicast broadcast receiving section 105 performs the process at the time of channel changes. When the changed channel name is provided from the remote control receiving section 102 to the IP multicast broadcast receiving section 105, the IP multicast broadcast receiving section 105 refers to the incorporated channel/address correspondence table as illustrated in FIG. 2, acquires a multicast address necessary for controlling the IP multicast network 107 (or the router), and performs control for channel changes to the IP multicast network 107 (or the router).

As illustrated in FIG. 2, one record of the channel/address correspondence table has a channel name field 201, a multicast source address field 202, and a multicast group address field 203. The channel name is the channel number for enabling the general user to actually identify the channel from a program table. The multicast source address and the multicast group address are paired address information that are information for identifying a multicast packet.

The channel information transmitting section 103 transmits the viewing information (IP packet) of one piece or plural pieces of channel information, including the channel name and time before and after change to the IP multicast network 107. The detail function of the channel information transmitting section 103 will be apparent in the later-described operation section.

The server information holding section 104 holds the information illustrated in FIG. 3. Namely, the server information holding section 104 holds an address 301 of the viewing information receiving server 109 as the address for transmitting the viewing information, and a viewing information largest transmission interval 302 that is the upper limit of the interval to transmit the viewing information to the viewing information receiving server 109. The information held by the server information holding section 104 may be provided from the IP multicast network 107 at the time of authentication when power-on, and may be set and operated at the time of initial installation of the terminal.

(A-2) The Operation of the First Exemplary Embodiment

The operation of the IP multicast broadcast system 100 having the above configuration, in particular, an operation in connection with the collection of the viewing information, will be described next.

Figure 4:
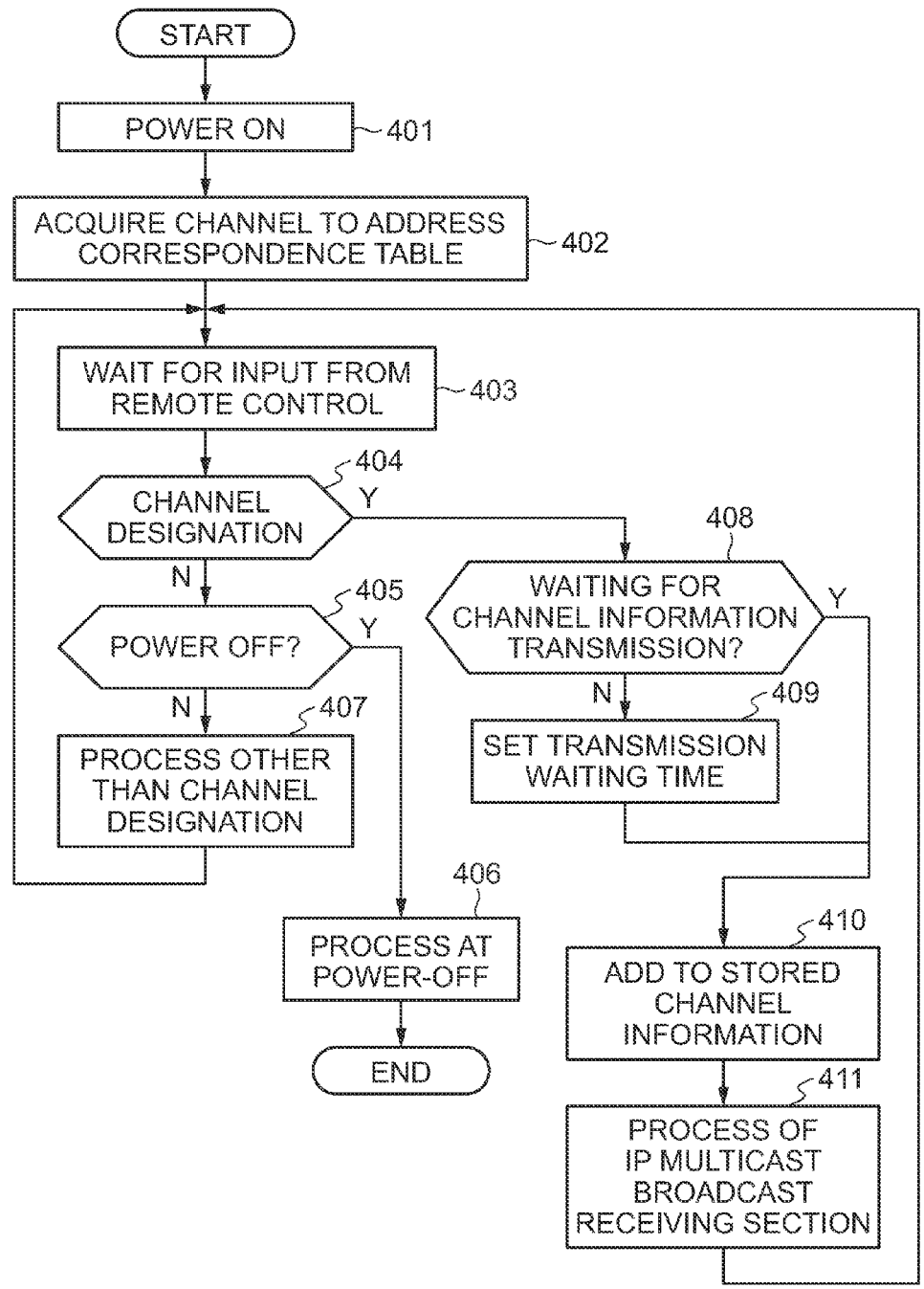
FIG. 4 is a flowchart illustrating a series of operations of holding changed channel information in an IP multicast receiving terminal, according to the first exemplary embodiment.

FIG. 4 is a flowchart illustrating a series of operations of holding changed channel information in the IP multicast receiving terminal 101. In the first exemplary embodiment, when channel changes, the changed channel information is stacked without transmitting the viewing information immediately.

When being turned on, the IP multicast receiving terminal 101 is initialized so as to be in the operated state (step 401). Then, the IP multicast receiving terminal 101 acquires and holds the information of the channel/address correspondence table illustrated in FIG. 2 (step 402). The information of the channel/address correspondence table may be stacked in the IP multicast receiving terminal 101 in advance (in this case, step 402 is omitted). Further, the IP multicast receiving terminal 101 may acquire the information of the channel/address correspondence table from the predetermined server (e.g., the IP multicast broadcast server 108). For example, in order that the IP multicast receiving terminal 101 is initialized so as to be in the operated state, the user authentication of the IP multicast network 107 is necessary.

When the process of steps 401 and 402 is ended, the routine is moved to the state of waiting for the instruction from the remote control transmitting device (step 403). In FIG. 4, immediately after power-on, the routine is moved to the received state after channel designation. However, the channel name selected at the power-off immediately therebefore may be backup stored and, at power-on, the receiving process based on the backup stored channel name may be automatically executed. The process in this case is almost the same as a series of processes in steps 404 to 410 of FIG. 4. In the same process as step 410, the stop operation of the previous selected channel is not executed.

When there is an instruction from the remote control transmitting device in the state of waiting for the instruction from the remote control transmitting device, it is determined whether the instruction is a new channel designation instruction (channel change instruction) (step 404), a power-off instruction (step 405), or an instruction other than those.

For the power-off instruction, the process at power-off is executed (step 406). The process at power-off includes the process of informing the delivery stop of the IP multicast network 107 and the process of informing the delivery stopped channel to the viewing information server 109.

When the instruction from the remote control transmitting device is neither the channel designation instruction nor the power-off instruction, after the process according to the instruction (e.g., volume change instruction) is executed (step 407), the routine returns to the state of waiting for the instruction from the remote control transmitting device.

When the instruction from the remote control transmitting device is the channel designation instruction, it is determined whether or not the current state is the channel information (viewing information) transmission waiting state (step 408). As described later, a channel information transmission waiting flag is set in the channel information transmission waiting state. The flag is checked to determine the state.

If the current state is not the channel information transmission waiting state, the later-described process (see FIG. 5) of determining the transmission waiting time and moving to the transmission waiting state, is performed (step 409). Then, if the current state is the channel information transmission waiting state, the designation instructed channel information is immediately added to the held channel information for transmission (step 410). When the routine is moved from step 409 to step 410, the first channel information is held by the addition process. The channel information is held together with the held time or the time at which the channel is designated. Further, the channel name on the viewing start side and the channel name on the viewing stop side are included.

The IP multicast broadcast receiving section 105 performs the process of changing to the designated channel, and then changes to the video and audio of the multicast broadcast channel (step 411). The routine returns to the state of waiting for the instruction from the remote control transmitting device.

Figure 5:
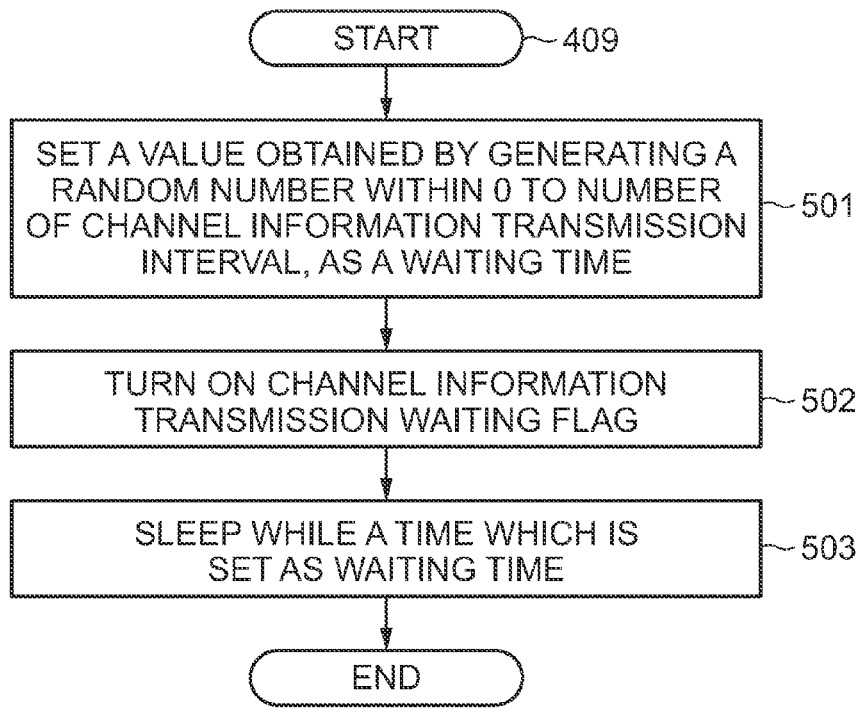
FIG. 5 is a flowchart illustrating the detail of step 409 of FIG. 4.

FIG. 5 is a flowchart illustrating the detail of step 409 of the process of determining the transmission waiting time so that the routine is moved to the transmission waiting state.

The number (transmission waiting time) from 0 sec to the held viewing information largest transmission interval 302 illustrated in FIG. 3 is generated using a random number (step 501).

The random number may be generated using the existing technique. For example, when the random number in the range of 0 to 1 is used, the random number is multiplied by a constant for making the random number equal to the digit number of the viewing information largest transmission interval. The remainder obtained by dividing the multiplied value by the viewing information largest transmission interval is used as the transmission waiting time. For example, when the viewing information largest transmission interval is 120 (sec) and the generated random number is 0.152, the transmission waiting time is 32 (sec) by the following calculation.

$$0.152 \times 1000/120 = 152/120 = 1 \ldots 32$$

In the above, the transmission waiting time is determined using the random number. However, the transmission waiting time may be determined using information (a MAC address, an IP address, and a telephone number) specific to the terminal 101. The number 1.2 times the low-order two-digit number of the IP address may be the transmission waiting time. When the low-order two-digit number is "34", the transmission waiting time is 34×1.2=4.08 (sec).

As described above, if the transmission waiting time is determined, after the channel information transmission waiting flag is set (step 502), sleep is started for the determined transmission waiting time (step 503). The process illustrated in FIG. 5 is ended in the state of starting sleep.

Figure 6:
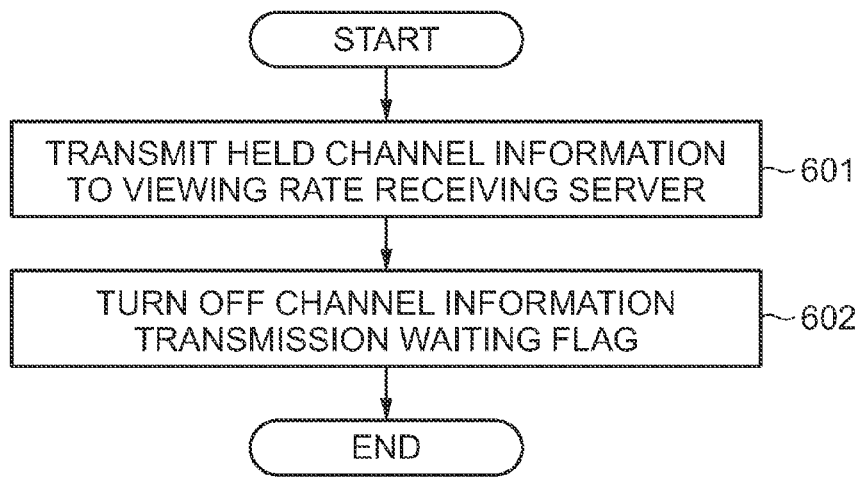
FIG. 6 is a flowchart illustrating an operation after a lapse of a transmission waiting time, according to the first exemplary embodiment.

The process of FIG. 5 need not be stopped until sleep is ended. The process of FIG. 5 is ended to start the later-described process of FIG. 6 by the ending of sleep. The ending of sleep is grasped by time up of the timer for measuring the determined transmission waiting time. FIG. 6 is a flowchart illustrating the process when sleep is ended.

When sleep in ended, all the channel information held at the end point is transmitted together as the viewing information to the viewing information receiving server 109 (step 601). Then, the channel information transmission waiting flag is reset (step 602). As described above, the channel information transmitted includes the held time or the time at which the channel is instructed in addition to the channel name.

The viewing information may be transmitted according to TCP (/IP) or UDP. UDP does not have the re-transmission function so that the viewing information packet remains lost. When the information calculated by the viewing information receiving server 109 is the viewing rate, the rate of the lost viewing packet corresponds to the rate of the designated channel. Thus, when UDP is employed, the viewing rate can be accurately calculated. In UDP, the number of pieces of viewing information reaching the viewing information receiving server 109 is small. Accordingly, the process load of the viewing information receiving server 109 can be reduced.

Figure 7:
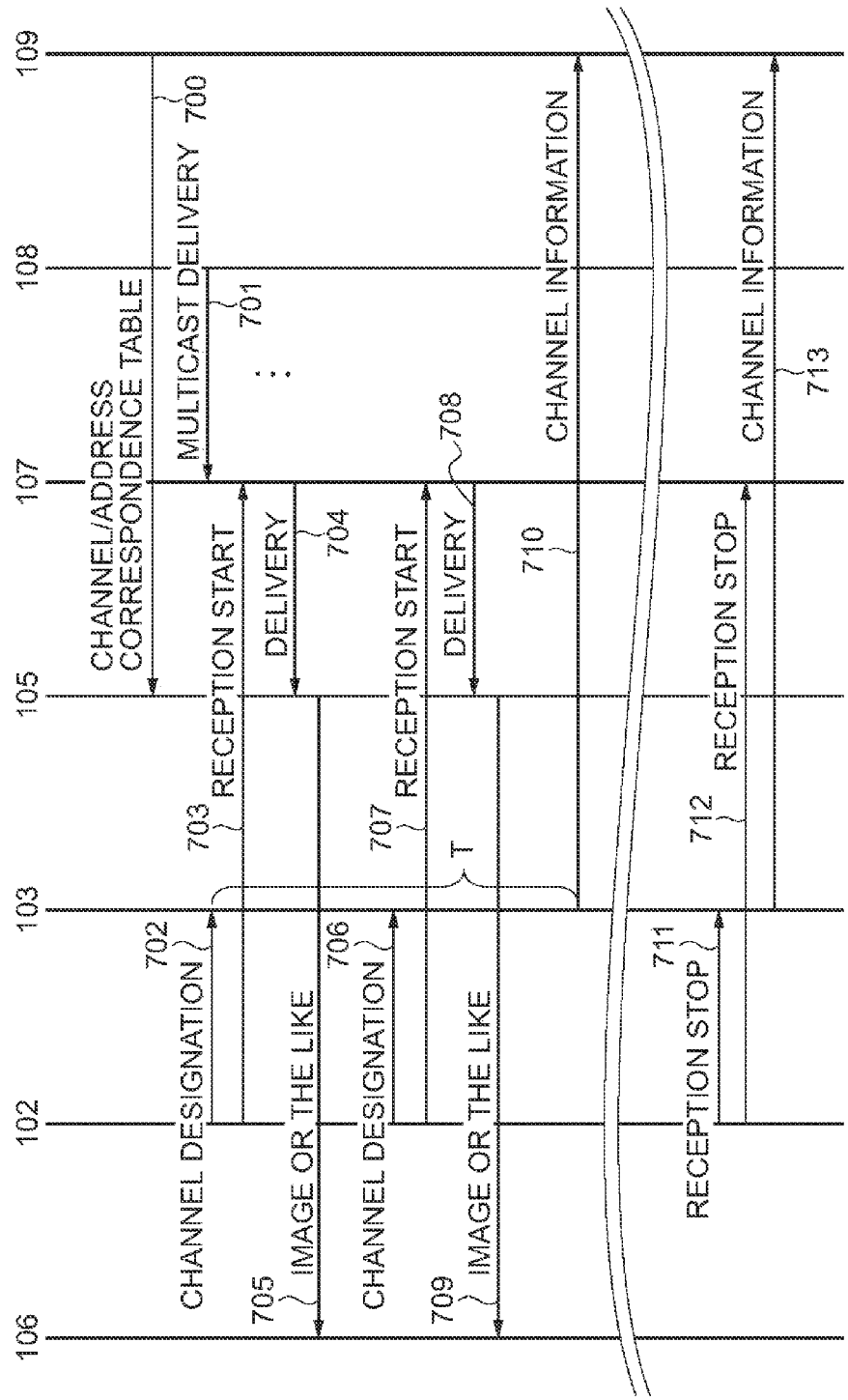
FIG. 7 is a sequence diagram of the sections of the IP multicast broadcast system, according to the first exemplary embodiment.

FIG. 7 is a sequence diagram of the sections of the IP multicast broadcast system, according to the first exemplary embodiment.

Immediately after the IP multicast receiving terminal 101 is turned on, the channel/address correspondence table is provided from the IP multicast broadcast server 108 (or the authentication server) to the IP multicast broadcast receiving section 105 and is then held (step 700).

The multicast delivery to the IP multicast network 107 by the IP multicast broadcast server 108 is executed all the time (step 701).

When the IP multicast receiving terminal 101 is not in the channel information transmission waiting state, if the new channel is designated by the remote control transmitting device, the new channel designation is informed from the remote control receiving section 102 to the channel information transmitting section 103 (step 702) and the multicast reception start of the new channel is informed to the IP multicast network 107 (step 703). The informing to the IP multicast network 107 may be performed via the IP multicast broadcast receiving section 105. The informing of the multicast reception start of the new channel means the stop of the multicast reception of the previous channel.

The channel information transmitting section 103 to which the new channel designation is informed, stores the informed channel information and determines a transmission waiting time T so as to be in sleep state.

The IP multicast network 107 (or the closest router) to which the multicast reception start of the new channel is informed, stops the multicast delivery of the previous designated channel, and then starts the multicast delivery of the new designated channel (step 704). Thus, the IP multicast broadcast receiving section 105 decompresses a video signal and an audio signal from data of the multicast delivery of the new designated channel, and provides them to the television receiver 106 for display (step 705).

When the new channel is designated during the measurement of the transmission waiting time, the new channel designation is informed from the remote control receiving section 102 to the channel information transmitting section 103 (step 706) and the multicast reception start of the new channel is informed to the IP multicast network 107 (step 707).

The channel information transmitting section 103 to which the new channel designation is informed, stores the informed channel information. However, since the channel information transmitting section 103 is currently measuring the transmission waiting time T (sleep state), it continues the measurement.

The IP multicast network 107 (or the closest router) to which the multicast reception start of the new channel is informed, stops the multicast delivery of the previous designated channel, and then starts the multicast delivery of the new designated channel (step 708). The IP multicast broadcast receiving section 105 decompresses the video signal and the audio signal from data of the multicast delivery of the new designated channel, and provides them to the television receiver 106 for display (step 709).

When the measurement of the determined transmission waiting time T is ended (the sleep state is ended), the channel information transmitting section 103 informs together, as the viewing information, the channel information of viewing start informed in steps 702 and 706 to the viewing information receiving server 109 (step 710).

When the power-off instruction of the IP multicast receiving terminal 101 is provided, the reception stop is informed to the channel information transmitting section 103 (step 711) and the multicast reception stop of the viewing channel is informed to the IP multicast network 107 (step 712).

The channel information transmitting section 103 to which the reception stop of the viewing channel is informed immediately informs, as the viewing information, the channel information in connection with the reception stop of the viewing channel to the viewing information receiving server 109 (step 713). The IP multicast network 107 stops the delivery to the IP multicast receiving terminal 101 that has informed the multicast reception stop.

(A-3) The Effect of the First Exemplary Embodiment

According to the first exemplary embodiment, the channel information is transmitted after a lapse of the transmission waiting time, determined based on the random number. Thus, even if there is caused dispersion of viewing channels in which many viewers change the channels simultaneously, the transmission to the viewing information receiving server is dispersed in terms of time and the collection of the viewing information can be carried out more accurately.

Such effect can be exhibited by substantially the function change of the IP multicast receiving terminal 101. In other words, it is unnecessary to provide many viewing information receiving servers and routers on the IP multicast network.

For example, if a hundred thousand IP multicast receiving terminals are operated, to view the Olympic opening ceremony from 10 o'clock, the users may simultaneously perform channel changes for the delivery of the Olympics during 5 sec before and after 10 o'clock (a total of 10 sec).

In this case, the conventional viewing information receiving server need to perform a hundred thousand processes during 10 sec. If the processes are not ended within 10 sec, a mechanism for stacking requests of a hundred or thousand processes is necessary. On the average, ten thousand processes are necessary during 1 sec.

On the other hand, in the first exemplary embodiment, a hundred thousand processes are divided almost equally during 120 sec and reach the server. On the average, the process of 100000/120=834 during 1 sec may be performed. The efficiency is increased to 12 times.

The process of the IP multicast receiving terminal may be complicated, however, is not complicated to 12 times. The channel information is simply stacked on the terminal.

(B) Second Exemplary Embodiment

A second exemplary embodiment of a channel selective information transmitting device and method according to the invention will be described in detail with reference to the drawings. The channel selective information transmitting device of the second exemplary embodiment is provided in a home gateway device at home, which includes the IP multicast receiving terminal and transmits channel selective information.

(B-1) The Configuration of the Second Exemplary Embodiment

Figure 8:
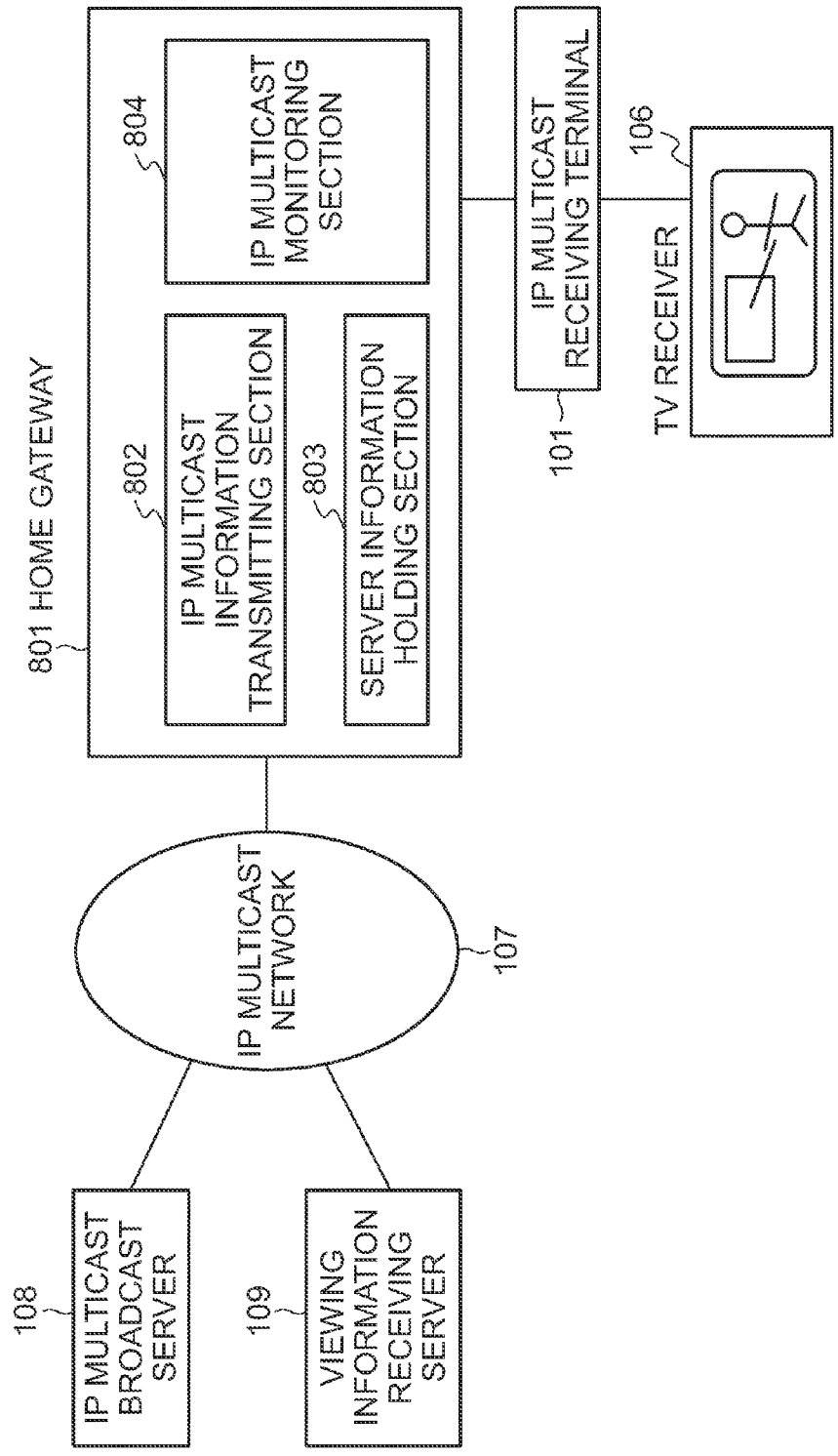
FIG. 8 is a block diagram illustrating the configuration of an IP multicast broadcast system including a channel selective information transmitting device, according to a second exemplary embodiment.

FIG. 8 is a block diagram illustrating the configuration of an IP multicast broadcast system including the channel selective information transmitting device, according to the second exemplary embodiment. Like and corresponding parts as in FIG. 1, according to the first exemplary embodiment, are indicated by similar reference numerals.

In FIG. 8, an IP multicast broadcast system 800 has the IP multicast receiving terminal 101, the television receiver (TV receiver) 106, the IP multicast broadcast server 108, the viewing information receiving server 109, and a home gateway 801. The home gateway 801, the IP multicast broadcast server 108, and the viewing information receiving server 109 are connected to the IP multicast network 107.

The television receiver 106, the IP multicast broadcast server 108, and the viewing information receiving server 109 are the same as those of the first exemplary embodiment. The IP multicast receiving terminal 101 excludes the function of collecting the viewing information from the IP multicast receiving terminal of the first exemplary embodiment.

Nowadays, there are various IP communication devices for home communicated by an IP protocol. For example, there is a personal computer for enjoying the Internet and an IP phone besides the IP multicast receiving terminal 101. The home gateway 801 includes plural IP communication devices and connects them with the IP network. That is, the home gateway 801 connects the IP multicast receiving terminal 101 to the IP multicast network 107. The home gateway 801 and the IP multicast network 107 (or the router) are connected by the B-FLET'S (trademark).

In view of the viewing information collecting function, the home gateway 801 has an IP multicast information transmitting section 802, a server information holding section 803, and an IP multicast monitoring section 804. The sections 802 to 804 effectively function when the IP multicast receiving terminal 101 functions.

The IP multicast monitoring section 804 acquires and holds the list information of the multicast addresses of a channel (IP multicast) monitored and illustrated in FIG. 9 from the viewing information receiving server 109 or the IP multicast broadcast server 108. Using the list information, the IP multicast monitoring section 804 filters the packet of the channel (IP multicast) monitored. As illustrated in the list of FIG. 9, for example, the multicast address monitored is the multicast source address of the IP multicast currently delivered by the multicast broadcast server 108.

The IP multicast information transmitting section 802 transmits, as the viewing information, the information (multicast address) in connection with the channel designated by the viewer, identified by the monitoring of the IP multicast monitoring section 804, to the viewing information receiving server 109. The function of the IP multicast information transmitting section 802 is the same as that of the channel information transmitting section 103 according to the first exemplary embodiment.

The server information holding section 803 holds the information illustrated in FIG. 10. Namely, the server information holding section 803 holds an address 1001 of the viewing information receiving server as the address for transmitting the viewing information, a multicast address information acquiring interval 1002, and a viewing information largest transmission interval 1003. The multicast address information acquiring interval 1002 is an interval for acquiring the multicast address information from the viewing information receiving server 109 or the IP multicast broadcast server 108. The viewing information largest transmission interval 1003 shows the largest interval from when the multicast information transmitting section 802 receives the updated multicast information and transmits it to the viewing information receiving server 109.

(B-2) The Operation of the Second Exemplary Embodiment

The operation of the IP multicast broadcast system 800 having the above configuration, in particular, an operation of the collection of the viewing information, will be described next.

Figure 11:
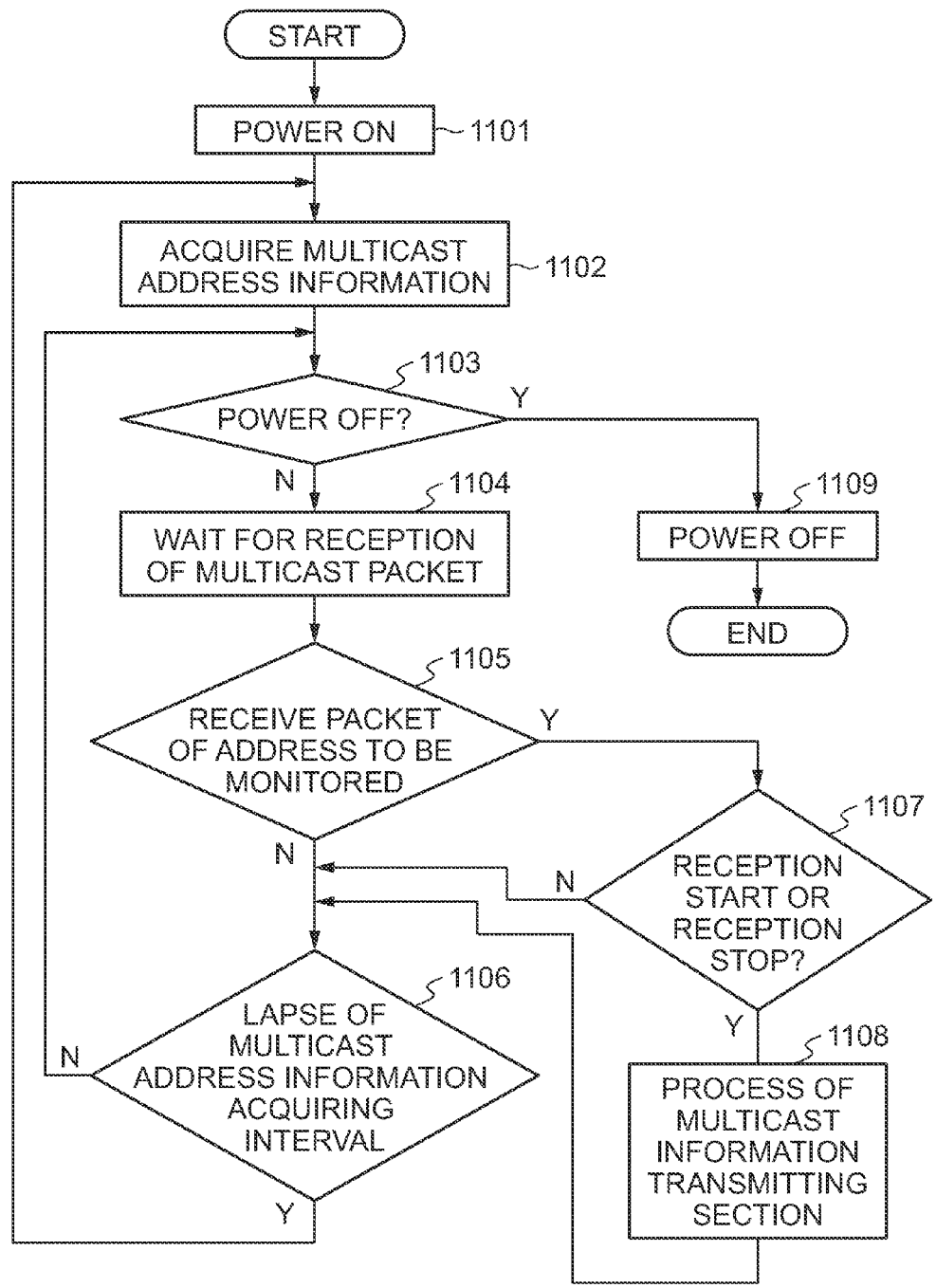
FIG. 11 is a flowchart illustrating a series of operations of holding and transmitting multicast address information updated and transmitted by the IP multicast receiving terminal in a home gateway, according to the second exemplary embodiment.

FIG. 11 is a flowchart illustrating a series of operations of holding and transmitting the multicast address information updated and transmitted by the IP multicast receiving terminal 101 in the home gateway 801.

In the second exemplary embodiment, the home gateway 801 stacks the changed multicast address information without transmitting the viewing information immediately, when the IP multicast receiving terminal 101 updates and transmits the multicast address (in other words, changes the channels).

When being turned on, the home gateway 801 is initialized so as to be in the operated state (step 1101). Hereafter, it is assumed that the IP multicast receiving terminal 101 is also turned on and the home gateway 801 validates the communication of the IP multicast receiving terminal 101.

The home gateway 801 acquires the multicast address information illustrated in FIG. 9 (step 1102). In the first exemplary embodiment, the IP multicast receiving terminal 101 may acquire the channel information of the IP multicast broadcast as the viewing information transmission target in a predetermined period.

Then, while checking the power source is not turned off (step 1103), the reception of the packet from the IP multicast receiving terminal 101 to the IP multicast network 107 is waited (step 1104).

When the power source is turned off, the process at power-off is executed (step 1109). The process at power-off includes the process of informing, to the viewing information server 109, the previously received IP multicast address including that the multicast is in the delivery stop state.

When the packet is received from the IP multicast receiving terminal 101 to the IP multicast network 107, it is determined whether or not the multicast address defining the IP multicast delivery of the packet is the address monitored defined by the list of FIG. 9 (step 1105).

When the multicast address is the packet of the address monitored, it is determined whether or not the packet is the packet instructing the reception start or the reception stop of the IP multicast broadcast (step 1107). When the packet is the packet instructing the reception start or the reception stop of the IP multicast broadcast, the process of the IP multicast information transmitting section 802 is executed (step 1108). The process of the IP multicast information transmitting section 802 is the same as steps 408, 409 (FIG. 5), and 410, and the process illustrated in FIG. 6 according to the first exemplary embodiment. The "channel information" according to the first exemplary embodiment may be identified as the "multicast address information (multicast information)".

Since FIG. 11 is described form the side of collecting the viewing information, it is omitted. However, it is needless to say that, the packet from the IP multicast receiving terminal 101 to the IP multicast network 107 is transmitted to the IP multicast network 107 via the home gateway 801.

In FIG. 11, at the reception stop, the multicast information is transmitted to the viewing information receiving server 109 after a lapse of the transmission waiting time. As in the first exemplary embodiment, at the reception stop, the multicast information may be transmitted to the viewing information receiving server 109 before a lapse of the transmission waiting time. On the other hand, with regard to the first exemplary embodiment, there can be given a modification example in which at the reception stop, the channel information is transmitted to the viewing information receiving server 109 after a lapse of the transmission waiting time.

Here, when the process corresponding to step 410 according to the first exemplary embodiment is ended, the routine is moved to step 1106. When the received packet is not the packet of the address monitored and when the received packet is the packet of the address monitored and is not the packet instructing the reception start or the reception stop of the IP multicast delivery, the routine is moved to step 1106.

In step 1106, it is determined whether or not the time of the multicast address information acquiring interval from the previous acquiring of the multicast address information is lapsed. When it is lapsed, the routine returns to step 1102. When not, the routine returns to step 1103.

FIG. 12 is a sequence diagram of the sections of the IP multicast broadcast system according to the second exemplary embodiment.

Immediately after being turned on, the home gateway 801 acquires and holds the list information of the multicast address illustrated in FIG. 9 from the viewing information receiving server 109 (step 1200).

The multicast delivery to the IP multicast network 107 by the IP multicast broadcast server 108 is executed all the time (step 1201).

When the IP multicast receiving terminal 101 to which the new channel of the IP multicast broadcast is designated transmits the packet requiring the reception start of the new channel, the IP multicast monitoring section 804 of the home gateway 801 identifies that (step 1202), and the packet is transmitted to the IP multicast network 107 (step 1203).

The IP multicast network 107 (or the closest router) that receives the packet of the reception start of the multicast of the new channel, stops the multicast delivery of the previous designated channel, and then starts the multicast delivery of the new designated channel (step 1204). Thus, the IP multicast receiving terminal 101 decompresses the video signal and the audio signal from data of the multicast delivery of the new designated channel, and provides them to the television receiver 106 for display (step 1205).

The IP multicast monitoring section 804 informs, to the IP multicast information transmitting section 802, that the IP multicast monitoring section 804 identifies the packet of the reception start of the new channel (step 1206). It is assumed that the transmission waiting time is not being measured. In this case, the IP multicast information transmitting section 802 stores the informed multicast information and determines a transmission waiting time T1 so as to be in the sleep state.

When the IP multicast receiving terminal 101 to which the new channel of the IP multicast broadcast is designated transmits the packet requiring the reception start of the new channel, the IP multicast monitoring section 804 of the home gateway 801 identifies that (step 1207), and the packet is transmitted to the IP multicast network 107 (step 1208).

The IP multicast network 107 (or the closest router) that receives the packet of the reception start of the multicast of the new channel, stops the multicast delivery of the previous designated channel, and then starts the multicast delivery of the new designated channel (step 1209). Thus, the IP multicast receiving terminal 101 decompresses the video signal and the audio signal from data of the multicast delivery of the new designated channel, and provides them to the television receiver 106 for display (step 1210).

The IP multicast monitoring section 804 informs, to the IP multicast information transmitting section 802, that the IP multicast monitoring section 804 identifies the packet of the reception start of the new channel again (step 1211). The IP multicast information transmitting section 802 stores the informed multicast information, however, since the IP multicast information transmitting section 802 is measuring the transmission waiting time T1 (sleep state), therefore continues the measurement.

When the measurement of the determined transmission waiting time T1 is ended (the sleep state is ended), the IP multicast information transmitting section 802 informs together, to the viewing information receiving server 109, as the viewing information, the multicast information of the reception start informed in steps 1206 and 1211 (step 1212).

When the IP multicast receiving terminal 101 transmits the packet requiring the reception stop of the new channel based on the power-off instruction, the IP multicast monitoring section 804 of the home gateway 801 identifies that (step 1213) and the packet is transmitted to the IP multicast network 107 (step 1214).

The IP multicast network 107 (or the closest router), that receives the packet of the reception stop of the multicast, stops the multicast delivery of the previous designated channel.

The IP multicast monitoring section 804 informs, to the IP multicast information transmitting section 802, that the IP multicast monitoring section 804 identifies the packet of the reception stop (step 1215). When the transmission waiting time is not being measured, the IP multicast information transmitting section 802 stores the multicast information in which stop is informed, and determines a transmission waiting time T2 so as to be in the sleep state.

When the measurement of the determined transmission waiting time T2 is ended (the sleep state is ended), the IP multicast information transmitting section 802 informs, to the viewing information receiving server 109, as the viewing information, the multicast information of the reception stop informed in step 1215 (step 1216).

(B-3) The Effect of the Second Exemplary Embodiment

According to the second exemplary embodiment, the multicast information is transmitted after a lapse of the transmission waiting time, determined based on the random number. Thus, even if there is caused dispersion of viewing channels in which many viewers change the channels simultaneously, the transmission to the viewing information receiving server is dispersed in terms of time and the collection of the viewing information can be carried out more accurately.

Such effect can be exhibited by substantially the function change of the home gateway 801. In other words, it is unnecessary to provide many viewing information receiving servers and routers on the IP multicast network.

(C) Other Exemplary Embodiments

The description of the above embodiments can be variously modified. Furthermore, the modified exemplary embodiments illustrated below can be given.

In the exemplary embodiments, the transmission waiting time is determined using the random number or the information (a MAC address, an IP address, and a telephone number) specific to the terminal 101. However, the transmission waiting time may be determined by a different method in which plural terminals or plural home gateways are uniformly distributed. For example, the transmission waiting time may be determined using the time at power-on of the incorporated timer. When the "min" of the time at power-on is an odd number, the "sec" of the time may be applied as the transmission waiting time. When the "min" of the time at power-on is an even number, the time obtained by adding 60 (sec) to the "sec" of the time may be applied as the transmission waiting time. In the modification example, the same transmission waiting time is applied in the power-on period.

When the random number is not applied, the transmission waiting time determined by the above method is the initial transmission waiting time. After that, at each determination timing of the transmission waiting time, the time obtained by adding a predetermined time to the previous time may be the transmission waiting time (when the added value exceeds the largest transmission waiting time, the time obtained by subtracting the largest transmission waiting time from the added value is the transmission waiting time).

In the exemplary embodiments, all the channel information or the multicast information caused during the transmission waiting time is transmitted together. However, the transmission timing may be determined from the number of the information transmitted together. For example, the concept of the transmission waiting time may be eliminated and transmission may be executed each time the channel information or the multicast information numbers a predetermined number (e.g., three). In addition, basically, transmission may be executed each time the channel information or the multicast information numbers a predetermined number (e.g., three) and, exceptionally, when the channel information and the multicast information does not number the predetermined number and the transmission waiting lapse time is long and is a predetermined time, the channel information and the multicast information may be transmitted. In such modification example, immediately after power-on and power-off, the channel information and the multicast information may be transmitted irrespective of the predetermined number. In this case, the concept of the transmission waiting time of the exemplary embodiments may be introduced and the channel information and the multicast information may be transmitted.

Furthermore, in the exemplary embodiments, all the channel information and all the multicast information are transmitted. When the lapse time from the time at which a channel (a) is changed to the time at which a channel (b) is changed is short (e.g., less than 10 sec), the channel information and the multicast information in connection with the channel (a) may be removed from the transmission target. The concept of the transmission waiting time is introduced so that the time between the channel changing operations can be easily monitored. The minimum time of the transmission waiting time is not 0 and may be above the time to determine for ignoring transmission.

Whether the transmission protocol of the viewing information is TCP or UDP, when the viewing information (the channel information and the multicast information) is transmitted, the first previous transmitted viewing information may be stored and be transmitted together with the new viewing information. When UDP is employed, such modification example solves the packet loss.

In the second exemplary embodiment, one IP multicast receiving terminal is included in one home gateway. However, plural IP multicast receiving terminals may be included in one home gateway. In this case, the IP multicast information transmitting section 802, the server information holding section 803, and the IP multicast monitoring section 804 for the IP multicast receiving terminals may be set and processed in one home gateway. Without discriminating all the housed IP multicast receiving terminals, the IP multicast information transmitting section 802, the server information holding section 803, and the IP multicast monitoring section 804 may function.

In the exemplary embodiments, only the viewing information is transmitted to the viewing information server. However, at the time of the transmission of the viewing information, other information such as QoS (Quality of Service) may be informed together to the server. The informed information may include information input by the operation of the remote control transmitting device by the viewer, such as a questionnaire result and QoE (Quality of Experience) of reproduced quality.

Although not mentioned in the description of the exemplary embodiments, the IP multicast broadcast server 108 may be the server for re-transmitting terrestrial digital broadcast by IP multicast broadcast. The IP multicast broadcast system for re-transmitting the terrestrial digital broadcast requires localizability and anonymity. A viewing information server may be provided locally (by prefecture). Due to the achievement of the anonymity, dummy data (e.g., random number data) may be inserted into the source address of the packet of the viewing information. The employment of UDP functions in the anonymity. When the viewing information server is sharably used, personal information is not inserted in the data section and local information may be incorporated.

No matter, whether or not the terrestrial digital broadcast is re-transmitted by the IP multicast broadcast, when the information in connection with the user on the source side is not inserted into the viewing information which is transmitted to the viewing information server, in consideration of the anonymity, a device for transmitting incorrect viewing information to incorrectly operate the viewing rate, can be considered. To cope with such incorrect device, there can be given, as an example, a method of changing the IP address and the port number of the viewing information server periodically or non-periodically, providing a changing method of the information on the current IP address and port number and the information on a new (e.g., for two days) IP address and port number to the terminal in which viewing is OK by user authentication at power-on, and enabling only the correct terminal to identify the correct address information of the viewing information all the time. Further, if it is system that can transmit to specify the source from the viewing information, the system may check the validity of the sequentially provided reception start and reception stop and may check the fraud.

In the exemplary embodiments, the invention is applied to the IP multicast receiving terminal and the home gateway. However, the invention may be applied to terminals of other systems. For example, when the CATV receiving terminal is connected, not only to the CATV broadcast network, but also to the IP network, so that the CATV receiving terminal and the viewing information receiving server can be communicated, the invention is applicable to the CATV receiving terminal. The invention is applicable to the receiving terminal of the audio IP multicast broadcast.

Although not mentioned in the description of the exemplary embodiments, the component exhibiting the feature function of the IP multicast receiving terminal and the home gateway may be realized by a CPU and a program (including data) executed by the CPU.

The invention claimed is:

1. A communication apparatus comprising:
    a storage section that stores network identification information that corresponds to information of broadcasting signals;
    a receiving section that receives information associated with a selected broadcasting signal as selection information, wherein the selected broadcasting signal is selected by a user of the communication apparatus;
    a first transmitting section that extracts the network identification information that corresponds to the selection information from the storage section, and that transmits a request signal for a broadcasting signal, to a network connected to a broadcasting server, wherein the request signal includes the extracted network identification information for a broadcasting signal; and
    a second transmitting section that transmits a non-transmitted selection information to a viewing information server, wherein the non-transmitted selection information is selection information that has not been transmitted to the viewing information server out of the selection information, wherein the selection information is received by the receiving section, and wherein the selection information corresponds to the network identification information of the request signal that is transmitted by the first transmitting section.

2. The communication apparatus according to claim 1, wherein the receiving section receives power-off information that relates to a power-off of the communication apparatus, and wherein the power-off information is selected by a user of the communication apparatus, and
    wherein the second transmitting section transmits the non-transmitted selection information to the viewing information server, wherein the non-transmitted selection information is selection information that has not been transmitted to the viewing information server out of the selection information when the receiving section has received the power-off information.

3. The communication apparatus according to claim 1, further comprising a first measuring section,
wherein the receiving section receives power-off information that relates to a power-off of the communication apparatus,
wherein the first measuring section starts measurement of a first time period when the receiving section receives the power-off information when the first time period is not being measured, and
wherein the second transmitting section transmits the non-transmitted selection information that has not been transmitted out of the selection information the receiving section has received, to the viewing information server, after the measured first time period has elapsed a first predetermined period from when the receiving section has received the power-off information.

4. The communication apparatus according to claim 1, further comprising a second measuring section that starts measurement of a second time period when the receiving section receives the selection information when the second time period is not being measured, and
wherein the second transmitting section transmits the non-transmitted selection information that has not been transmitted out of the selection information the receiving section has received, to the viewing information server, after the measured second time period has elapsed a second predetermined period.

5. The communication apparatus according to claim 1, further comprising a third measuring section that measures a time period from when the receiving section receives previous selection information as a second selection information until when the receiving section receives present selection information as a third time period, each time the receiving section receives the selection information, and
wherein the second transmitting section transmits the non-transmitted selection information that has not been transmitted out of the selection information the receiving section has received, to the viewing information server except the second selection information, if the measured third time period is shorter than a third predetermined period.

6. The communication apparatus according to claim 1, further comprising
a second measuring section that starts measurement of a second time period when the receiving section receives the selection information when the second time period is not being measured,
a third measuring section that measures a time period from when the receiving section receives previous selection information as a second selection information until when the receiving section receives present selection information as a third time period, each time the receiving section receives the selection information, and
wherein the second transmitting section transmits the non-transmitted selection information that has not been transmitted out of the selection information the receiving section has received, to the viewing information server except the second selection information, if the measured third time period is shorter than a third predetermined period and after the measured second time period has elapsed a second predetermined period.

7. The communication apparatus according to claim 1, wherein the communication apparatus is an IP multicast receiving terminal.

8. A communication method carried out by a communication apparatus comprising a storing section that stores network identification information that corresponds to information of broadcasting signals, the method comprising:
a receiving step that receives information associated with a selected broadcasting signal as selection information, wherein the selected broadcasting signal is selected by a user of the communication apparatus;
a first transmitting step that extracts the network identification information that corresponds to the selection information from the storage section, and that transmits a request signal for a broadcasting signal, to a network connected to a broadcasting server, wherein the request signal includes the extracted network identification information for a broadcasting signal; and
a second transmitting step that transmits a non-transmitted selection information to a viewing information server, wherein the non-transmitted selection information is selection information that has not been transmitted to the viewing information server out of the selection information, wherein the selection information is received by the receiving step, and wherein the selection information corresponds to the network identification information of the request signal that is transmitted by the first transmitting step.

9. The communication method according to claim 8, wherein the receiving step receives power-off information that relates to a power-off of the communication apparatus, and wherein the power-off information is selected by a user of the communication apparatus, and
wherein the second transmitting step transmits the non-transmitted selection information to the viewing information server, wherein the non-transmitted selection information is information that has not been transmitted to the viewing information server out of the received selection information, when the power-off information has been received in the receiving step.

10. The communication method according to claim 8, further comprising a first measuring step,
wherein the receiving step receives power-off information that relates to a power-off of the communication apparatus,
wherein the first measuring step starts measurement of a first time period when the power-off information has been received in the receiving step when the first time period is not being measured, and
wherein the second transmitting step transmits the non-transmitted selection information that has not been transmitted out of the received selection information received in the receiving step, to the viewing information server, after the measured first time period has elapsed a first predetermined period from when the power-off information has been received in the receiving step.

11. The communication method according to claim 8, further comprising a second measuring step that starts measurement of a second time period when the selection information has been received in the receiving step when the second time period is not being measured, and
wherein the second transmitting step transmits the non-transmitted selection information that has not been transmitted out of the received selection information received in the receiving step, to the viewing information server, after the measured second time period has elapsed a second predetermined period.

12. The communication method according to claim 8, further comprising a third measuring step that measures a time period from when previous selection information has been received in the receiving step as a second selection information until when present selection information has been received in the receiving step as a third time period, each time the selection information has been received in the receiving step, and
    wherein the second transmitting step transmits the non-transmitted selection information that has not been transmitted out of the received selection information received in the receiving step, to the viewing information server except the second selection information, if the measured third time period is shorter than a third predetermined period.

13. The communication method according to claim 8, further comprising
    a second measuring step that starts measurement of a second time period when the selection information has been received in the receiving step when the second time period is not being measured,
    a third measuring step that measures a time period from when previous selection information has been received in the receiving step as a second selection information until when present selection information has been received in the receiving step as a third time period, each time the selection information has been received in the receiving step, and
    wherein the second transmitting step transmits the non-transmitted selection information that has not been transmitted out of the received selection information that has been received in the receiving step, to the viewing information server except the second selection information, if the measured third time period is shorter than a third predetermined period and after the measured second time period has elapsed a second predetermined period.

14. The communication method according to claim 8, wherein the communication apparatus is an IP multicast receiving terminal.

15. A non-transitory computer readable medium storing a program for controlling a communication apparatus comprising a storing section that stores network identification information that corresponds to information of broadcasting signals, wherein the program, when executed, executes the steps of:
    a receiving step that receives information associated with a selected broadcasting signal as selection information, wherein the selected broadcasting signal is selected by a user of the communication apparatus;
    a first transmitting step that extracts the network identification information that corresponds to the selection information from the storage section, and that transmits a request signal for a broadcasting signal, to a network connected to a broadcasting server, wherein the request signal includes the extracted network identification information for a broadcasting signal; and
    a second transmitting step that transmits a non-transmitted selection information to a viewing information server, wherein the non-transmitted selection information is selection information that has not been transmitted to the viewing information server out of the selection information, wherein the selection information is received by the receiving step, and wherein the selection information corresponds to the network identification information of the request signal that is transmitted by the first transmitting step.

16. The non-transitory computer readable medium according to claim 15, wherein the receiving step receives power-off information that relates to a power-off of the communication apparatus, and wherein the power-off information is selected by a user of the communication apparatus, and
    wherein the second transmitting step transmits the non-transmitted selection information to the viewing information server, wherein the non-transmitted selection information is information that has not been transmitted to the viewing information server out of the received selection information, when the power-off information has been received in the receiving step.

17. The non-transitory computer readable medium according to claim 15, the steps further comprising a first measuring step,
    wherein the receiving step receives power-off information that relates to a power-off of the communication apparatus,
    wherein the first measuring step starts measurement of a first time period when the power-off information has been received in the receiving step when the first time period is not being measured, and
    wherein the second transmitting step transmits the non-transmitted selection information that has not been transmitted out of the received selection information received in the receiving step, to the viewing information server, after the measured first time period has elapsed a first predetermined period from when the power-off information have been in received the receiving step.

18. The non-transitory computer readable medium according to claim 15, the steps further comprising a second measuring step that starts measurement of a second time period when the selection information has been received in the receiving step when the second time period is not being measured, and
    wherein the second transmitting step transmits the non-transmitted selection information that has not been transmitted out of the received selection information received in the receiving step, to the viewing information server, after the measured second time period has elapsed a second predetermined period.

19. The non-transitory computer readable medium according to claim 15, the steps further comprising a third measuring step that measures a time period from when previous selection information has been received in the receiving step as a second selection information until when present selection information has been received in the receiving step as a third time period, each time the selection information has been received in the receiving step, and
    wherein the second transmitting step transmits the non-transmitted selection information that has not been transmitted out of the received selection information received in the receiving step, to the viewing information server except the second selection information, if the measured third time period is shorter than a third predetermined period.

20. The non-transitory computer readable medium according to claim 15, the steps further comprising a second measuring step that starts measurement of a second time period when the selection information has been received in the receiving step when the second time period is not being measured,
    a third measuring step that measures a time period from when previous selection information has been received in the receiving step as a second selection information until when present selection information has been received in the receiving step as a third time period, each time the selection information has been received in the receiving step, and wherein the second transmitting step transmits the non-transmitted selection information that has not been transmitted out of the received selection information that has been received in the receiving step, to the viewing information server except the second selection information, if the measured third time period is shorter than a third predetermined period and after the measured second time period has elapsed a second predetermined period.

* * * * *